US010043018B2

(12) United States Patent
Melone

(10) Patent No.: US 10,043,018 B2
(45) Date of Patent: Aug. 7, 2018

(54) ACCESS PRIVILEGE ANALYSIS FOR A SECURABLE ASSET

(71) Applicant: Microsoft Technology Licensing, LLC, Redmond, WA (US)

(72) Inventor: Michael Jason Melone, Tampa, FL (US)

( * ) Notice: Subject to any disclaimer, the term of this patent is extended or adjusted under 35 U.S.C. 154(b) by 186 days.

(21) Appl. No.: 14/943,840

(22) Filed: Nov. 17, 2015

(65) Prior Publication Data
US 2017/0140159 A1    May 18, 2017

(51) Int. Cl.
*G06F 21/00* (2013.01)
*G06F 21/60* (2013.01)
*G06F 21/57* (2013.01)

(52) U.S. Cl.
CPC .......... *G06F 21/604* (2013.01); *G06F 21/577* (2013.01); *G06F 2221/2141* (2013.01)

(58) Field of Classification Search
CPC ................. G06F 21/604; G06F 21/577; G06F 2221/2141
See application file for complete search history.

(56) References Cited

U.S. PATENT DOCUMENTS

| | | | |
|---|---|---|---|
| 7,613,711 B2 | 11/2009 | Dutta et al. | |
| 7,845,003 B2 | 11/2010 | Morris et al. | |
| 8,196,178 B2 | 6/2012 | Lambert et al. | |
| 8,266,714 B2 | 9/2012 | Wang et al. | |
| 8,271,785 B1* | 9/2012 | Danoyan | G06F 21/31 713/167 |
| 8,413,219 B2 | 4/2013 | Downey et al. | |
| 8,843,994 B2 | 9/2014 | Tandon | |
| 8,863,293 B2 | 10/2014 | Christodorescu et al. | |
| 2006/0143447 A1* | 6/2006 | Vasishth | H04L 63/102 713/166 |
| 2006/0193467 A1 | 8/2006 | Levin | |
| 2006/0294194 A1* | 12/2006 | Graveline | H04L 63/0227 709/217 |
| 2007/0016773 A1* | 1/2007 | Perlman | G06F 21/6218 713/166 |
| 2007/0198933 A1* | 8/2007 | van der Bogert | G06F 21/52 715/741 |
| 2008/0104665 A1 | 5/2008 | Naldurg et al. | |

(Continued)

FOREIGN PATENT DOCUMENTS

CN   102098306   6/2011

OTHER PUBLICATIONS

"International Preliminary Report on Patentability Issued in PCT Application No. PCT/US2018/061760", dated Apr. 13, 2017, 17 Pages.
"International Search Report and Written Opinion Issued in PCT Application No. PCT/US2016/061760", dated Jan. 25, 2017, 11 Pages.
"Mandatory Integrity Control", Retrieved From: <https://msdn.microsoft.com/en-us/library/windows/desktop/bb648648(v=vs.85).aspx> Sep. 25, 2015, Dec. 8, 2013, 1 page.

(Continued)

*Primary Examiner* — John B King
(74) *Attorney, Agent, or Firm* — Buckley, Maschoff & Talwalkar LLC

(57) ABSTRACT

Techniques for access privilege analysis for a securable asset are described. According to various embodiments, a securable asset represents an object that is subject to access control. Generally, embodiments discussed herein can be employed to identify a principal that can be leveraged to obtain an access privilege to a securable asset, whether or not the principal is expressly granted an access privilege to the securable asset.

20 Claims, 11 Drawing Sheets

(56) References Cited

U.S. PATENT DOCUMENTS

| | | | | |
|---|---|---|---|---|
| 2009/0228967 A1* | 9/2009 | Gbadegesin | ........ | H04L 63/0807 726/8 |
| 2011/0154505 A1* | 6/2011 | Cowan | .................... | G06F 21/52 726/27 |
| 2011/0191485 A1* | 8/2011 | Umbehocker | ........ | G06F 21/604 709/229 |
| 2011/0231937 A1 | 9/2011 | Lippmann et al. | | |
| 2013/0276098 A1* | 10/2013 | Austin | .................... | G06F 21/52 726/17 |
| 2013/0312084 A1 | 11/2013 | Tandon | | |
| 2014/0259129 A1* | 9/2014 | Copsey | .................. | G06F 21/40 726/5 |
| 2015/0271200 A1* | 9/2015 | Brady | ................. | H04L 63/1416 726/4 |

OTHER PUBLICATIONS

"Security Principals Technical Overview", Retrieved From: <https://technet.microsoft.com/en-us/library/dn486814.aspx>, Nov. 1, 2013, 4 pages.

De"Deflecting Active Directory Attacks", In Proceedings of Securing Electronic Business Processes, Highlights of the Information Security Solutions Europe Conference, Oct. 10, 2006, 2 pages.

Gudger,"Password Crack a Domain Controller in under a minute", Retrieved From: <https://supertekboy.com/2014/02/13/password-crack-a-domain-controller-in-under-a-minute/#.Vd6txqO6YdU> Sep. 25, 2015, Feb. 13, 2014, 10 pages.

Lukan,"Pen Testing Domain Controllers", Retrieved From: <http://resources.infosecinstitute.com/domain-controlled> Sep. 25, 2015, Jan. 2, 2013, 10 pages.

\* cited by examiner

| Starting Service | Starting Principal | Ending Service | Ending Securable | EoP Chain | Depth |
|---|---|---|---|---|---|
| AuthentService | Enterprise Admins | AuthentService | Domain Guests | LocalDomain\Enterprise Admins > can write all attributes of >AuthentService\Domain Guests | 0 |
| ComputingDevice | ComputingDevice | AuthentService | Domain Guests | ComputingDevice\Computing Device > controls >AuthentService > which is the service that maintains >AuthentService\Account Operators > can can write all attributes of >AuthentService\Domain Guests | 2 |
| AuthentService | Administrators | AuthentService | Domain Guests | AuthentService\Administrators > can can write all attributes of >AuthentService\Account Operators > can can write all attributes of >LocalDomain\Domain Guests | 1 |
| ComputingDevice | ComputingDevice | AuthentService | Users | ComputingDevice > which controls > AuthentService\AuthentService> which is the service that maintains >AuthentService\Administrators > can can write all attributes of >AuthentService\Users | 2 |

| | Asset | Access Right | Entity | Access | Permitted | Elevation |
|---|---|---|---|---|---|---|
| 612 → | Computer | Admin | UserA | Y | Y | N |
| 614 → | Computer | Admin | UserB | Y | Y | N |
| | Local Domain | Admin | UserA | Y | Y | N |
| 616 → | Local Domain | Admin | UserB | Y | N | Y |
| | Directory Acct | Admin | UserA | Y | Y | N |
| 618 → | Directory Acct | Admin | UserB | Y | N | Y | columns: 600, 602, 604, 606, 608, 610

ACCESS PRIVILEGE ANALYSIS FOR A SECURABLE ASSET

BACKGROUND

Modern computing systems can be leveraged to access an array of different functionalities and content, such as for enterprise tasks, interpersonal communication, education, entertainment, and so forth. While such capabilities provide increasing convenience and productivity, they also introduce certain risks. For instance, an enterprise entity typically maintains sensitive data that it uses for its operations, and utilizes various services and accounts to control access to the data. An entity (e.g., a hacker) that gains unauthorized control of a particular identity may utilize the identity to access a particular service or account and thus access the sensitive data. Further, unauthorized access to a service and/or an account enables various malicious actions to be performed that cause harm to the enterprise entity.

Accordingly, different techniques have been developed for controlling access to functionality and data in attempts to prevent unauthorized access. For instance, access to a sensitive data file may be limited to a discrete set of user identities listed in an access control list for the data file. However, if an identity in the access control list becomes compromised, the data file may be exposed to an unauthorized entity. Further, the compromised identity may be used to gain unauthorized access to a particular service or account such that various malicious actions can be performed. With the ever-increasing connectedness of today's networks, tracking identities and enforcing permissions across different networks and domains presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for access privilege analysis for a securable asset are described. According to various embodiments, a securable asset represents an object that is subject to access control. Generally, embodiments discussed herein can be employed to identify a principal that can be leveraged to obtain an access privilege to a securable asset, whether or not the principal is expressly granted an access privilege to the securable asset.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 5 depicts an example implementation of a portion of an access analysis in accordance with one or more embodiments.

FIG. 6 depicts an example implementation of a portion of an access analysis in accordance with one or more embodiments.

DETAILED DESCRIPTION

Overview

Figure 1:
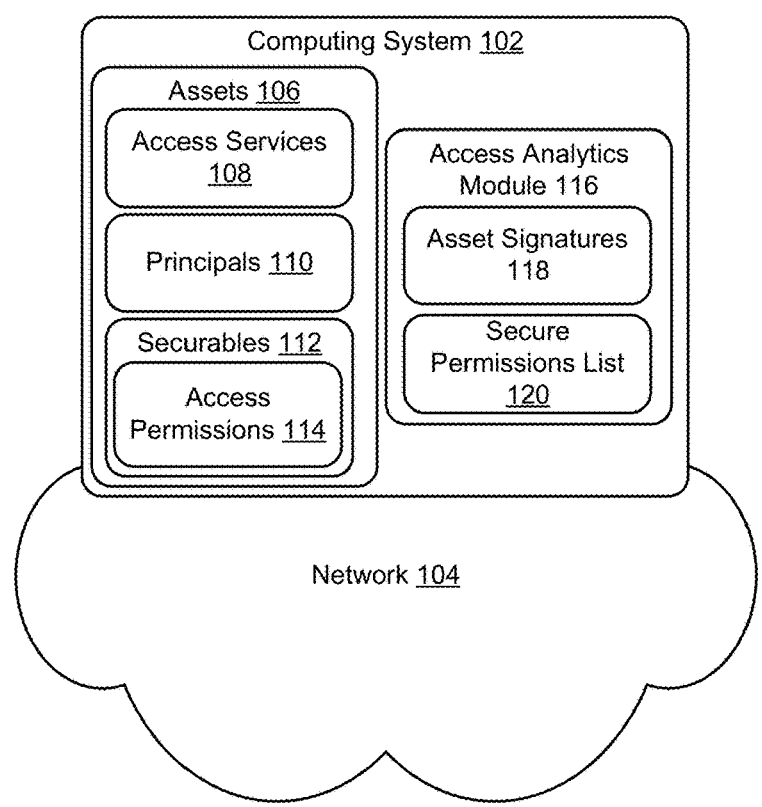
FIG. 1 is an illustration of an environment in an example implementation that is operable to employ techniques discussed herein.

Techniques for access privilege analysis for a securable asset are described. According to various implementations, a securable asset represents an object that is subject to access control and is thus "securable" via the access control. Examples of a securable asset include a file, a folder, a protected data domain, a protected functionality (e.g., a system service, an application, a utility, and so forth), a protected identity, and so on. Generally, implementations discussed herein can be employed to identify a principal that can be leveraged to obtain an access privilege to a securable asset, whether or not the principal is expressly granted an access privilege to the securable asset. A principal, for instance, represents an identity that can be used to obtain access to a securable asset.

According to various implementations, techniques discussed herein are employed to identify a principal that is granted an access privilege to a particular securable asset that enables the principal to be leveraged to obtain an access privilege to a different securable asset. The access privilege to the different securable asset, for instance, is not expressly granted to the principal, but is indirectly obtainable via the access privilege to the particular securable asset.

For instance, consider a scenario where a particular user identity is explicitly granted administrative access to a computing device (e.g., an operating system of the computing device), but is not explicitly granted access to an email service of the computing device. According to various implementations, a user may authenticate with the computing device using the user identity, and may leverage the administrative access to the computing device to obtain control of various services hosted by the computing device, including the email service. Thus, by taking control of the email service the user is able to access resources of the email service that they would otherwise be denied access to.

As another example, consider a scenario where a particular user identity is explicitly granted administrative access to a computing device (e.g., an operating system of the computing device), and that computing device hosts an authentication service. According to various implementations, a user may authenticate with the computing device using the user identity, and may leverage the administrative access to the computing device to obtain control of various services hosted by the computing device, including the authentication service. Thus, by taking control of the authentication service the user is able to access resources secured by the authentication service that they would otherwise be denied access to. Additionally, the user may impersonate any principal identified by the authentication service, thus gaining access to data secured to the impersonated accounts, but not to the initial user. For instance, the user can access sensitive data and functionalities to which a principal hosted by the authentication service is permitted access.

As yet another example, consider a scenario where a particular user identity is explicitly granted administrative access to another identity hosted by an authentication service. According to various implementations, the user may authenticate with the authentication service using the user identity, and may leverage administrative access to the other identity hosted within the authentication service to obtain control over (e.g., a user account), or membership in (e.g., a group), identities hosted by the authentication service, thus gaining access to data secured to the identities' accounts, but not to the initial user's particular identity.

Generally, these types of accesses represent "indirect access" paths that can expose various resources to unauthorized access and potentially harmful and malicious activities, such as theft of user identity data and other sensitive data, installation of malware, corruption of device functionality, and so forth.

According to various implementations, techniques are employed to identify such indirect access paths by generating signatures that represent different securable assets and access privileges to the securable assets. A particular signature, for instance, identifies an instance of a securable asset, and a particular type of access privilege to the securable asset. The signatures are then compared to a set of access control entries to ascertain whether a principal is usable to obtain a particular access privilege to a particular securable asset.

For instance, a particular principal is not expressly granted an access privilege to a particular securable asset, such as in an access control list (ACL) for the securable asset. However, the principal is granted an access privilege to a different securable asset which can be leveraged to obtain the access privilege to the particular securable asset. Accordingly, techniques described herein can be employed to identify such indirect access paths to securable assets, and to control the ability of such indirect access paths to be leveraged to obtain access privileges to securable assets. For instance, a principal that is not permitted an access privilege to a particular securable asset can be prevented from being utilized to obtain the access privilege through a different access privilege granted to the principal for a different securable asset.

Accordingly, techniques for access privilege analysis for a securable asset described herein enable sensitive resources to be protected from unauthorized access that may expose the sensitive resources to potentially harmful and malicious activities.

In the following discussion, an example environment is first described that is operable to employ techniques described herein. Next, a section entitled "Example Implementation Scenarios" describes some example implementation scenarios for access privilege analysis for a securable asset in accordance with one or more implementations. Following this, a section entitled "Example Procedures" describes some example procedures for access privilege analysis for a securable asset in accordance with one or more implementations. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques described herein. Generally, the environment 100 includes various devices, services, domains, and networks that are interconnected to enable various computing-related tasks to be performed. For instance, the environment 100 includes a computing system 102 which may be configured in a variety of ways, such as a traditional computer (e.g., a desktop personal computer, laptop computer, and so on), a mobile device, a network-based server, an interconnected collection of devices, and so forth. The computing system 102, for example, may represent a single computing apparatus and/or multiple interconnected apparatus that can be leveraged to perform techniques for access privilege analysis for a securable asset described herein. For instance, in at least some implementations the computing system 102 represents multiple different apparatus and/or systems that are distributed remotely from one another and are interconnected via a network 104. Example attributes and implementations of the computing system 102 are discussed below with reference to the example system 1100.

The network 104 is representative of a network that provides the computing system 102 with connectivity to various networks and/or services, such as the Internet. The network 104 may provide the computing system 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The computing system 102 includes a variety of different functionalities that enable various activities and tasks to be performed. For instance, the computing system 102 includes assets 106, which in turn include access services 108, principals 110, and securables 112. Generally, the access services 108 represent different ways of controlling access to assets across the computing system 102. For instance, the access services 108 represent functionalities that provide identification of the principals 110 and control access to the securables 112. In at least some implementations, each instance of a principal 110 that identifies it and each instance of a securable 112 is represented by a respective access service 108 that controls its access. Examples of services 108 include a directory service (e.g., a Lightweight Directory Access Protocol (LDAP) service), an access-controlled domain (e.g., a local device domain, a network domain, and so forth), an email server, and so forth.

The principals 110 generally represent data objects that can be leveraged to provide access to other assets, such as the securables 112. Examples of the principals 110 include a user account, a computer account, membership in an access group, and so forth. The principals 110, for instance, represent identities that can be used for identification and authentication across the computing system 102. In at least some implementations, individual securables 112 are associated with different respective identifiers that differentiate the individual securables 112 from one another.

According to various implementations, the securables 112 represent data objects to which access is controlled, such as through respective principals 110. Examples of the securables 112 include files, folders, protected data domains, user accounts, groups, protected functionalities (e.g., system services, applications, and so forth), and so on.

In at least some implementations, a particular instance of a principal 110 may represent a securable 112. For instance, consider a scenario where a directory identity in a directory service may be utilized gain access to another identity, such as an identity for a local computer that is within a domain of the directory service. In such a case the directory identity may be considered a securable 112 to which access is to be protected.

The securables 112 include access permissions 114, which are representative of functionality for controlling access to the individual securables 112. According to various implementations, individual instances of the securables 112 are associated with different instances of the access permissions 114 such that access to each securable 112 can be individually tailored and controlled. The access permissions 114, for instance, can be implemented as access control lists (ACLs) that identify different principals that have different types of access to the different securables 112.

Further to the environment 100, the computing system 102 includes an access analytics (AA) module 116, which is representative of functionality to identify different types of accesses to the assets 106 and to enable the accesses to be identified. For instance, the AA module 116 can be leveraged to identify:

(1) An aggregate set of accesses that a given user has, including what membership enabled the access and whether or not it is deemed administrative;

(2) An aggregate set of principals 110 that have access to a specified securable 112; and (3) Conditions under which a principal 110 can utilize legitimate access to a securable 112 in order to increase its level of access, and thus effectively elevating the principals 110's level of access.

These particular functionalities of the AA module 116 are provided for purpose of example only, and it is to be appreciated that the AA module 116 can be leveraged for a variety of other functionality, such as detailed below.

To assist in identifying these attributes, the computing system 102 maintains and/or has access to asset signatures 118. Generally, the asset signatures 118 identify different securables 112 and different types of accesses to the different securables 112. As further detailed below, the asset signatures 118 can be compared to the access permissions 114 to identify which principals 110 have a particular type of access to a securable 112. Among other purposes, this can be useful to identify principals 110 that have access privileges to perform certain actions on a securable 112, such as principals 110 with administrative access to a principal 110. Further, the asset signatures 118 can be leveraged to identify principals 110 that potentially have elevated or differing privilege in relation to a particular securable 112.

The computing system 102 further maintains and/or has access to a secure permissions list 120, which is representative of functionality for tracking which entities are permitted to access individual of the assets 106, and a permitted level of access for each of the entities to a respective asset 106. According to various implementations, the secure permissions list 120 is maintained in a secure location that is protected from access by other portions of the computing system 102. For instance, the secure permissions list 120 cannot be accessed using the principals 110. This enables the secure permissions list 120 to maintain the integrity of its permission data should one or more of the assets 106 become corrupted. According to techniques for access privilege analysis for a securable asset described herein, the AA module 116 may compare the access permissions 114 for the securables 112 to the secure permissions list 120. If a particular entity (e.g., a principal 110) is indicated in the access permissions 114 as having permission to a particular securable 112 that is not reflected in the secure permissions list 120, this may indicate unauthorized tampering with the access permissions 114.

Having described an example environment in which the techniques described herein may operate, consider now a discussion of some example scenarios for access privilege analysis for a securable asset in accordance with one or more implementations.

Example Implementation Scenarios

The following section describes some example implementation scenarios for access privilege analysis for a securable asset in accordance with one or more implementations. The implementation scenarios may be implemented in the environment 100 discussed above, utilizing the system 1100 described below, and/or any other suitable environment or system.

Figure 2:
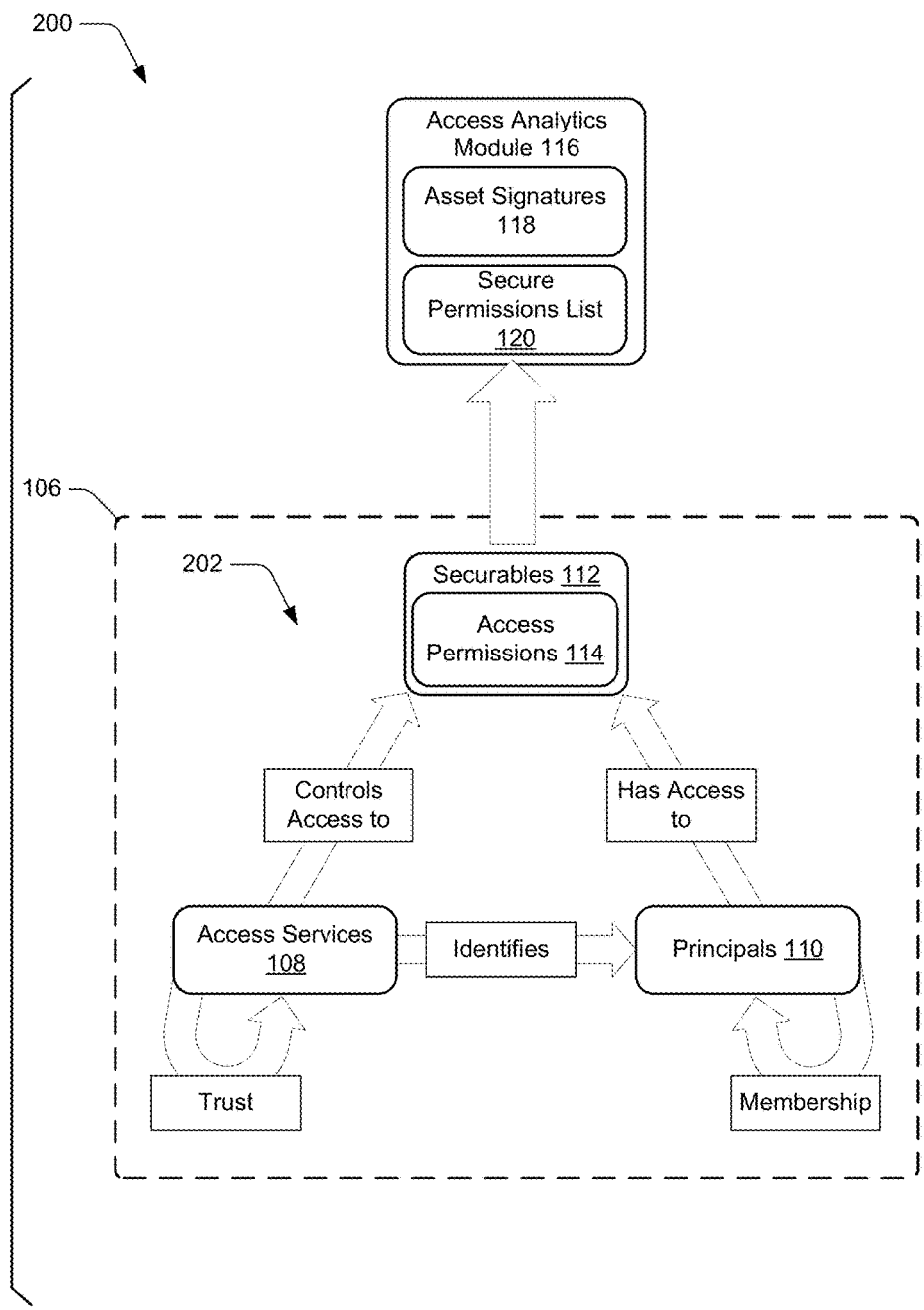
FIG. 2 depicts an example implementation scenario for defining different relationships that can be detected according to techniques for access privilege analysis for a securable asset in accordance with one or more embodiments.

FIG. 2 depicts an example implementation scenario 200 for defining different relationships that can be detected according to techniques for access privilege analysis for a securable asset in accordance with one or more implementations. The scenario 200 includes various entities and components introduced above with reference to the environment 100.

The scenario 200 includes a relationship graph 202, which depicts different types of relationships between the access services 108, the principals 110, and the securables 112. Generally, different relationships exist between the different assets, and a particular relationship determines an ability of one asset to affect another asset.

For instance, a controlling relationship refers to a relationship where administrative access over one asset may lead to a potential compromise of another asset. One example of a controlling relationship occurs between a directory service domain and a computer hosting the domain. If a principal 110 has administrative access to the computer hosting the directory service domain, the principal 110 can effectively be utilized to take control over the directory service domain. Another example is a principal 110 that represents a group within an access service 108 for accessing a web application platform. If the group has sufficient access to a securable 112 in the web application platform that grants sufficient permissions to the web application platform (e.g., administrative access), members of the group may be able to utilize this access to take control over the web application platform (e.g., an access service 108), thus enabling members to access to any resources secured by the web application platform.

With reference to the relationships graph 202, a principal 110 may have a controlling relationship over a securable 112 which may give it the ability to have administrative access to another asset, such as a service 108, a different securable 112, a different principal 110, and so forth.

Membership is another example of a relationship that may be exploited to affect an asset. Generally, membership is a relationship where a principal 110 provides access to resources that it controls to another principal 110 through association. One example membership relationship occurs between groups, whereby a member of a group can act with the authority of the group itself by virtue of being a member. With reference to the relationships graph 202, a particular principal 110 may represent a group, and a different principal 110 may be a member of the group.

A trust relationship refers to a relationship that may exist between different access services 108. For instance, when a trust relationship exists between different access services 108, a principal 110 authenticated with one of the access services 108 may be accepted as authenticated with another of the access services 108.

Accordingly, the access services 108 identify and authenticate the principals 110. Further, the access services 108 control access to the securables 112 by limiting access to the securables 112 to only authenticated principals 110 and/or other principals 110 that are permitted access to a securable 112 through association (e.g., membership with) an authenticated principal 110. Thus, a particular principal 110 may have access to a securable 112 by virtue of being authenticated with an access service 108 that controls access to the securable 112, by virtue of being a member of a principal 110 that is permitted by the access service 108 to access the securable 112, and/or by virtue of having access (e.g., administrative access) to another principal 110 that is authenticated for access to the securable 112.

Further to the scenario 200, asset signatures 118 can be generated to describe the different relationships between the assets 106, e.g., controlling relationships, membership relationships, and trust relationships. Accordingly, the AA module 116 can compare different properties of the assets 106 to the asset signatures 118 to ascertain which of the assets have the particular relationships with others of the assets 106. As further detailed below, the ascertained relationships may be compared with relationships indicated in the secure permissions list 120 to indicate whether a particular principal 110 has a disallowed access permission to a securable 112 and/or whether a particular principal 110 has an unintended (e.g., disallowed) elevation of privilege with respect to a particular securable 112.

Figure 3:
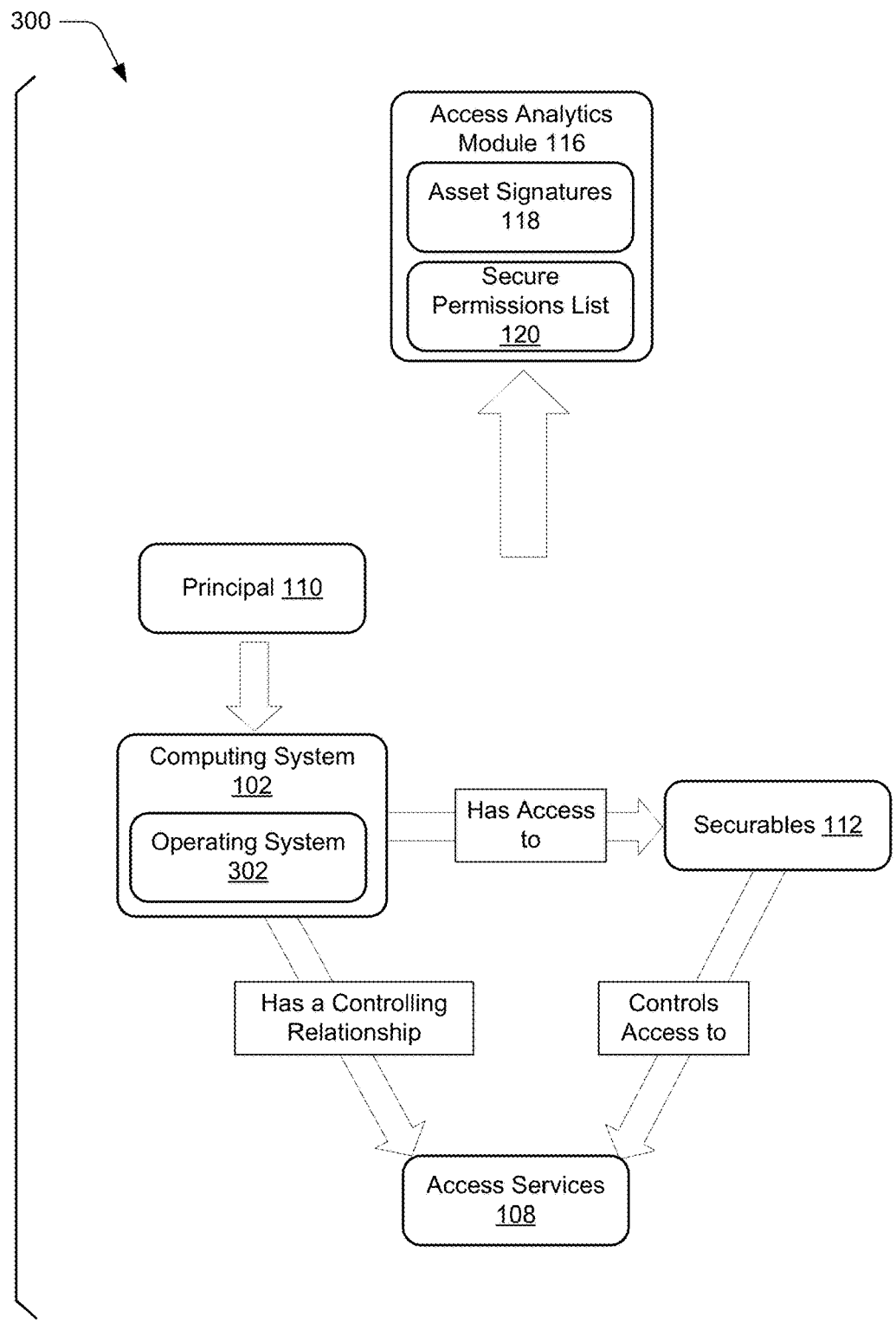
FIG. 3 depicts an example implementation scenario for characterizing different relationships that can be detected in accordance with one or more embodiments.

FIG. 3 depicts an example implementation scenario 300 for characterizing different relationships that can be detected according to techniques for access privilege analysis for a securable asset in accordance with one or more implementations. The scenario 300 includes various entities and components introduced above with reference to the environment 100. In at least some implementations, the scenario 300 represents an extension and/or variation on the relationships described above with reference to the scenario 200.

As depicted in the scenario 300, the computing system 102 has a controlling relationship over the access services 108. For instance, the access services 108 represent services that run on an operating system 302 of the computing system 102. Thus, control of the operating system 302 enables control of the access services 108. Further, the securables 112 can be used to control access to the access services 108. A particular securable 112, for example, limits access to an administrative object that exists within an access service 108 and thus enables administrative access to the access service 108. For instance, a securable 112 that grants administrative access to an access service 108 can reside within the service itself As an example, an object represented in the configuration of a particular access service 108 (e.g., objects that grant administrative access within the application that are not represented as a file, but rather a configuration item within a database) can grant administrative access to the particular access service.

As another example, a particular securable 112 controls access to a file that can be used to compromise an access service 108, such as a core data file of the access service 108.

As an example implementations, consider that a principal 110 is granted access to the computing system 102. In this particular scenario, the access granted to the principal 110 gives the principal 110 control of the operating system 302 of the computing system 102, and thus control of the access services 108 hosted by the operating system 302. Further, since the principal 110 is able to gain control of the access services 108, the principal 110 is able to gain access to the securables 112 that are secured by the access services 108.

Further to the scenario 300, asset signatures 118 can be generated to describe the different relationships between the computing system 102, the securables 112, and the access services 108. Accordingly, the AA module 116 can compare different properties of the computing system 102, the securables 112, and the access services 108 to the asset signatures 118 to identify the different relationships, e.g., controlling relationships, access relationships, and so forth.

Figure 4:
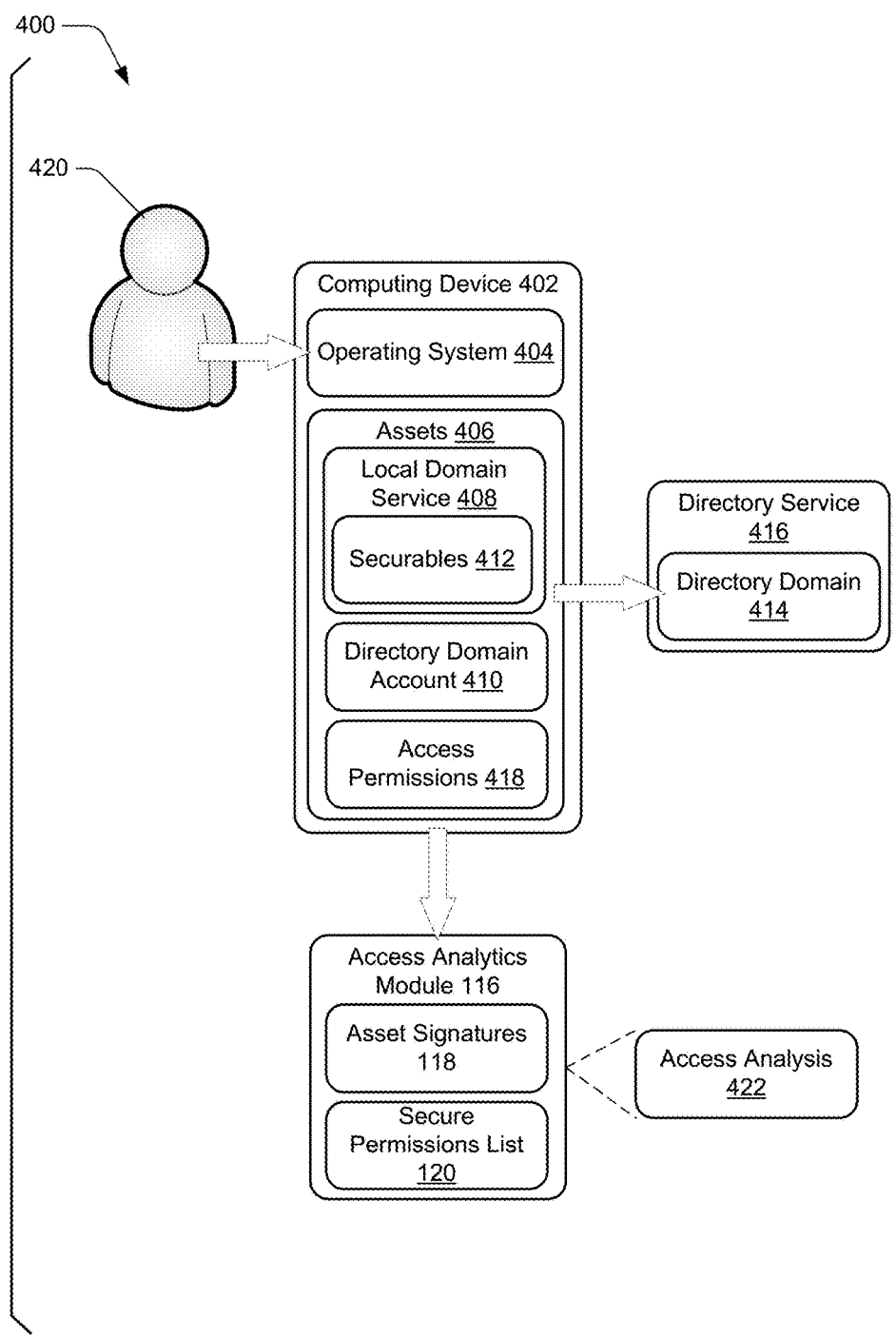
FIG. 4 depicts an example implementation scenario for identifying different accesses that a particular entity is permitted in accordance with one or more embodiments

FIG. 4 depicts an example implementation scenario 400 for identifying different accesses that a particular entity is permitted in accordance with one or more implementations. The scenario 300 includes a computing device 402 with an operating system 404. The computing device 302 may be implemented in various ways, an example of which is represented below with reference to the computing device 1102.

Generally, the computing device 402 includes multiple assets 406 that may be leveraged to represent itself, including a local domain service 408 and a directory domain account 410. The local domain service 408 represents a service that resides locally on the computing device and that controls access to securables 412 that resides on the computing device 402. The securables 412 represent protectable assets that reside on the computing device 402 and/or that are accessible via the computing device 402. Examples of the securables 412 include files, applications, services, identities (e.g., principals 110 of the computing device 402), and so forth.

The directory domain account 410 is representative of an account principal for the computing device 402 in a directory domain 414 of a directory service 416. For instance, the directory domain account 410 represents a membership of the computing device 402 in the directory domain 414 and entitles the computing device 402 to a set of privileges and permissions within the directory domain 414.

Generally, the computing device 402 (e.g., the operating system 404) controls the local domain service 408 and the directory domain account 410. Further, the local domain service 408 controls access to the securables 412 via access permissions 418 which specify different access permissions for the securables 412. The access permissions 418, for instance, include different respective sets of access permissions for each of the securables 412. In at least some implementations, the access permissions 418 includes ACLs for at least some of the securables 412.

According to various implementations, accesses directly enabled by the assets 406 depend on which particular asset 406 is being leveraged. However, access to one particular asset 406 can enable access to a different asset 406 and thus enable an entity to a different type of access privilege that may not be directly available through a particular asset.

For instance, consider that a user 420 is given administrative access to the operating system 404, but is not given access to others of the assets 406. The user 420, for example, is a computer technician that is given administrative access to the operating system 404 to enable the technician to perform repairs and maintenance on the computing device 402. While the administrative access enables the user 420 to perform legitimate repair and maintenance on the computing device 402, the user 420 may also utilize the administrative access to obtain certain extended and/or elevated access privileges. For instance, the user 420 can utilize the administrative access to take control of the local domain service 408 and the directory domain account 410. Thus, the user 420 may perform actions that are permitted by access privileges granted to the local domain service 408, such as access to the securables 412, reconfiguration of local domain service 408 account settings for a native user of the computing device 402, and so forth. Further, the user 420 may access the directory domain 414 according to access privileges granted to the directory domain account 410 within the directory domain. For instance, if the directory domain account 410 has administrative privileges within the directory domain 414, the user 420 may utilize the directory domain account 410 to perform administrative actions within the directory domain 414.

Further to techniques for access privilege analysis for a securable asset described herein, the AA module 116 generates different asset signatures 118 for the assets 404 that correspond to different types of access rights to the securable assets 404. The asset signatures 118, for example, are generated as strings that each represent a particular asset type and a particular access privilege to the particular asset type. For instance, an asset signature 118 for the computing device 402 can be generated as "Computer\Admin," which is used to identify entities that have administrative access to the computing device 402. Another asset signature 118 for the computing device 402 can be generated as "Computer\debug," which is used to identify entities that have permission to debug programs on the computing device 402. As yet another example, an asset signature 118 for the directory domain account 410 can be generated as "DirectoryDomain\TreateUser," which is used to identify entities that have permission via the directory domain account 410 to create new user accounts for the directory domain 414. These asset signatures 118 are presented for purpose of example only, and it is to be appreciated that a wide variety of different asset signatures 118 not expressly mentioned herein can be generated and utilized while remaining within the spirit and scope of the implementations discussed herein.

Further to the scenario 400, the AA module 116 can compare the asset signatures 118 to the access permissions 418 to generate an access analysis 422 that identifies entities (e.g., users and user types) that have particular access types to the different assets 106. For instance, the user 420 is listed in the access permissions 418 as having administrative access to the computing device 402. Thus, by comparing entries in the access permissions 418 to the asset signature 118 "ComputingDevice\admin," the user 420 is identified in the access analysis 422 as having administrative access to the computing device 402. According to various implementations, the AA module 116 can compare multiple different asset signatures 118 to multiple different entries in the access permissions 114 to aggregate in the access analysis 422 a list of different entities that have different access permissions to the different assets 106.

In at least some implementations, the access analysis 422 not only identifies entities that are explicitly identified in the access permissions as having a particular type of access to a particular asset 106, but also identifies entities that are able to obtain particular access types to other assets by virtue of their explicitly-granted access rights. For instance, the access analysis 422 not only indicates that the user 420 is entitled to administrative access to the computing device 402, but also indicates that the user 420 may utilize this administrative access to gain access to other assets that the user 420 is not explicitly granted in the access permissions 418. The access analysis 422, for example, indicates that the user 420 can utilize its administrative access to the computing device 402 to gain control of the local domain service 408 and the directory domain account 410. The access analysis 422 further indicates that by controlling the directory domain account 410, the user 420 obtains access privileges within the directory domain 414, such as administrative rights. Thus, the access analysis 422 not only identifies access privileges explicitly granted to a user by the access permissions 418, but may also identify access rights to the assets 406 that are implicitly granted to the user by virtue of their explicitly granted rights.

FIG. 5 depicts an example implementation of a portion of the access analysis 422 in accordance with one or more implementations. Generally, this portion of the access analysis 422 identifies different access chains that enable different principals to gain access to different securables 112.

This portion of the access analysis includes a starting service column 500, a starting principal column 502, an ending service column 504, an ending securable column 506, an elevation of privilege (EoP) column 508, and a depth column 510. The starting service column 500 identifies different services that are analyzed by the AA module 116 for identification of different principals. For instance, the starting service column 500 includes specific instances of services that identify principals of the starting principal column 502. The starting principal column 502 identifies different principals that are utilized to initiate an access analysis. A principal identified in the starting principal column 502, for instance, is utilized as an initiation point for determining an access analysis.

The ending service column 504 identifies a service that identifies a securable indicated in the ending securable column 506, and the ending securable column 506 generally identifies different securable types to which different access privileges can be granted, either explicitly or implicitly. The EoP column 508 identifies an access chain that enables a starting principal identified in the starting principal column 502 to gain access to an ending securable identified in the ending securable column 506. Further, the depth column 510 identifies a recursion depth for a corresponding EoP chain identified in the EoP column 508. For instance, consider the following examples.

Generally, the different rows in the access analysis 422 identify different EoP analyses for access to securables identified in the ending securable column 506. For example, an analysis result 512 indicates how a starting principal "Enterprise Admins" identified in the starting principal column 502 can gain access to a "Domain Guests" securable identified in the ending securable column 506. The analysis result 512 further indicates that the starting service and the ending service are the same, i.e., the AuthentService service, e.g., a particular authentication service that hosts a service domain. As indicated in the EoP column 508 for the analysis result 512, an EnterpriseAdmin can gain access to the DomainGuests by virtue of having permission to "write all attributes of" the DomainGuests, as identified in the EoP column 508. For instance, an ACL for the DomainGuests indicates that an EnterpriseAdmin has permission to write attributes of the DomainGuests. Since this is a direct access that does not involve an elevation of privilege, the depth column 510 indicates a recursion depth of zero ("0").

As another example, consider an analysis result 514, which indicates how a ComputingDevice can be leveraged to gain access to a DomainGuests securable. Generally, the analysis result 514 indicates that using access to a particular computing device (i.e., as indicated by "ComputingDevice" in the starting service column 500), a user can gain access to the DomainGuests of the AuthentService. The EoP column 508 specifies that EoP chain that enables this access: The ComputingDevice controls the AuthentService, which is the service that maintains AccountOperators of the AuthentService. Further, AccountOperators have permissions to write all attributes of DomainGuests of the AuthentService. Thus, via this EoP chain, access to the ComputingDevice can be leveraged to gain access to the DomainGuests securable. The values for the starting service column 500 and the ending service column 504 for the analysis result 514 identify the EoP chain results as reflected in the EoP column 508. As indicated, the access chain started in the ComputingDevice and ended in obtaining access to the AuthentService. As indicated in the depth column 510, this access chain represents a recursion depth of two ("2") since the starting service and the ending service are different, and a principal "Account Operators" used to gain access to the ending securable "DomainGuests" is different than the starting principal "ComputingDevice."

Thus, this portion of the access analysis 422 identifies different ways in which access to different securables can be obtained. While this particular portion of the access analysis 422 includes a limited number of analysis results, it is to be appreciated that techniques described herein can be employed to determine an aggregate number and type of accesses for a variety of different principals.

FIG. 6 depicts an example implementation of a portion of the access analysis 422 in accordance with one or more implementations. Generally, the access analysis 422 identifies different assets and access types, and indicates whether certain entities are granted access to the assets. The access analysis 422 may be implemented in various ways, such as a data table, a database entry, a database report, and so forth.

This portion of the access analysis 422 includes an asset column 600, an access right column 602, an entity column 604, an access column 606, a permitted column 608, and an elevation column 610. The asset column 600 lists different assets to which varying levels of access may be granted. Examples of different assets are detailed above.

The access right column 602 lists different access rights that are grantable to the assets listed in the asset column 600. Although this portion of the access analysis 422 is depicted with reference to an administrative ("Admin") access right, it is to be appreciated that techniques for access privilege analysis for a securable asset discussed herein may be employed to identify a variety of different access rights. Examples of other access rights include "standard user," "guest," and so forth.

According to various implementations, the values used to populate the asset column 600 and the access right column 602 are obtained from the asset signatures 118 discussed above. For instance, the asset signatures 118 are parsed to identify different asset values and access right values, which are then used to populate the asset column 600 and the access right column 602, respectively.

The entity column 604 lists different entities that can be analyzed for access to different of the assets listed in the asset column 600. In this particular example, different users are listed in the entity column 604. Generally, a variety of different entities may be listed in the entity column 604, such as users, groups, domains, and so forth. In at least some implementations, different principals 110 can be populated to the entity column 604.

The access column 606 indicates whether an entity listed in the entity column 604 is granted an access type identified in the access right column 602 to an asset identified in the asset column 600. Generally, whether or not a particular entity is granted particular type of access to a particular asset is determined according to techniques for access privilege analysis for a securable asset described herein.

The permitted column 608 indicates whether an entity that is granted a particular type of access to a particular asset (as indicated by a yes ("Y") in the in the access column 606) is permitted to have such access. As indicated above, by virtue of having a particular type of access to a first asset, a particular user may be granted a particular type of access to a second asset. Further, allowing the particular type of access to the second asset may be unintended and/or disallowed for the user. Thus, the permitted column 608 indicated whether the access available to a particular entity to a particular asset is allowed. In at least some implementations, whether an available access is permitted is determined by comparing available accesses from the access analysis 422 to permitted accesses in the secure permissions list 120.

The elevation column 610 indicates whether an allowed access as indicated in the access column 606 represents an elevation of privilege for a particular entity. Generally, an elevation of privilege occurs when an entity is able to use a permitted access to an asset to obtain increased access privilege to another asset that the entity is not expressly granted. For instance, elevation of privilege represents an "unintended" access privilege that an entity has to a particular asset that occurs as a result of an "intended" access privilege that the entity is granted to another asset.

The different rows in the access analysis 422 generally correspond to different discrete access analyses for different assets listed in the asset column 600. For instance, an analysis result 612 represents an access analysis for a UserA's access to a computing device, e.g., the computing device 402. As indicated, the analysis result 612 indicates that UserA has administrative access to the computer and that the administrative access is permitted. Thus, the elevation column 610 indicates that UserA's administrative access to the computer does not represent an elevation of privilege, as indicated by "N" for "No."

Further, an analysis result 614 indicates that a UserB entity has administrative access to the computer that is permitted, and thus does not represent an elevation of privilege. An analysis result 616, however, indicates that UserB has administrative access to a local domain that is not permitted, as indicated by "N" ("No") in the permitted column 608. For instance, as part of performing an access analysis on the assets 406 of the computing device 402, the AA module 116 determines that by having granted administrative access to the operating system 404, UserB may leverage the administrative access to gain administrative access to the local domain service 408. Accordingly, the elevation column 610 for the analysis result 616 indicates that UserB's administrative access to the local domain represents an elevation of privilege, i.e., "Y."

Similarly, an analysis result 618 indicates that the UserB has administrative access to a directory domain that is not permitted, and that such access represents an elevation of privilege. For instance, as part of performing an access analysis on the assets 406 of the computing device 402, the AA module 116 determines that by being able to obtain administrative access to the local domain service via its granted administrative access to the operating system 404, UserB may leverage the administrative access to the local domain service 408 to gain administrative access to the directory domain 414 via the directory domain account 410.

Accordingly, the access analysis 422 identifies different entities that have different access privileges to different assets, and whether a particular access privilege is permitted and/or represents an elevation of privilege. The particular values utilized in the different columns and rows are provided for purpose of example only, and it is to be appreciated that a wide variety of different assets, access rights, and entities may be analyzed for access rights according to techniques for access privilege analysis for a securable asset described herein.

Having discussed some example implementation scenarios, consider now a discussion of some example procedures in accordance with one or more embodiments.

Example Procedures

The following discussion describes some example procedures for access privilege analysis for a securable asset in accordance with one or more embodiments. The example procedures may be employed in the environment 100 of FIG. 1, the system 1100 of FIG. 11, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed by various functionalities, such as the AA module 116.

Figure 7:
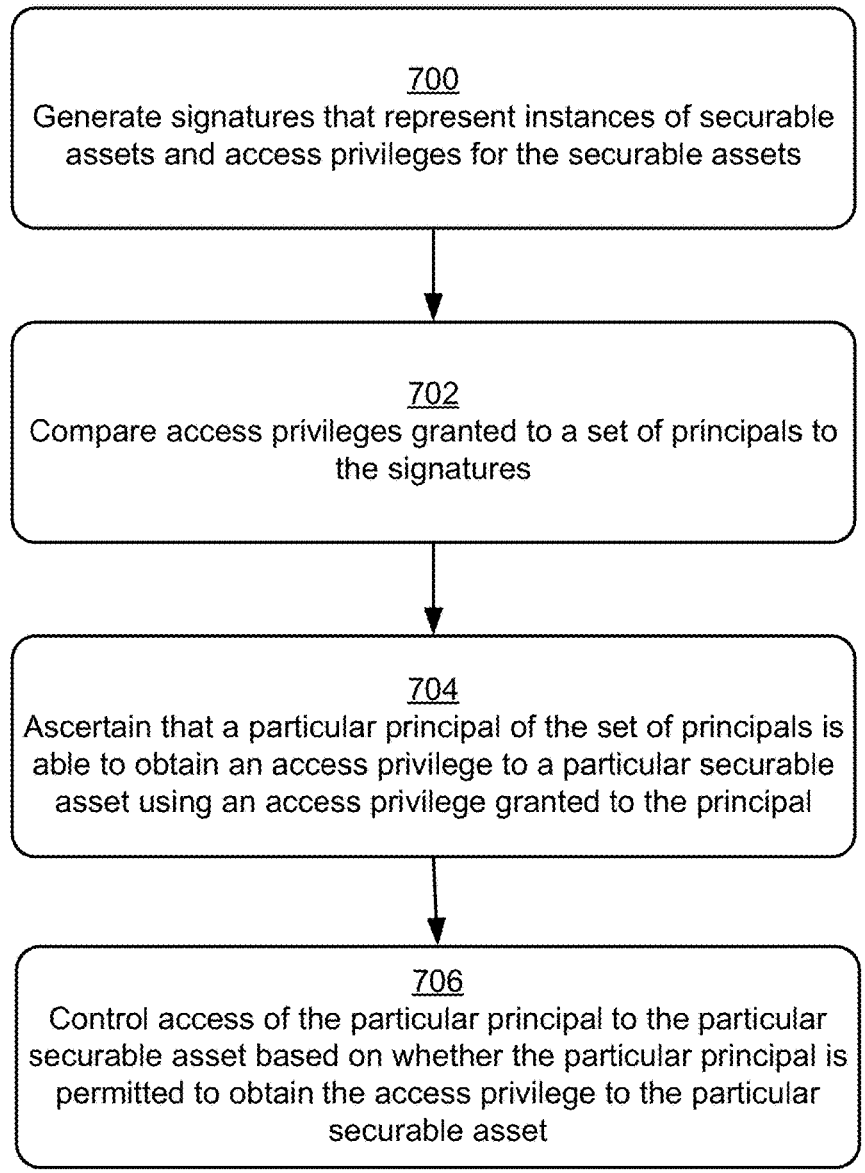
FIG. 7 is a flow diagram that describes steps in a method for ascertaining that a principal is able to obtain an access privilege to a securable asset accordance with one or more embodiments.

FIG. 7 is a flow diagram that describes steps in a method in accordance with one or more implementations. The method describes an example procedure for ascertaining that a principal is able to obtain an access privilege to a securable asset in accordance with one or more implementations.

Step 700 generates signatures that represent instances of securable assets and access privileges for the securable assets. For instance, the AA module 116 generates the asset signatures 118 to represent different instances of the assets 106 and the access permissions 114 for the assets 106. In at least some implementations, a signature for each asset 106 is generated by constructing a string (e.g., a sequence of characters) that identifies the asset and that identifies a particular access privilege to an asset type.

For instance, an example signature for a particular asset 106 can be generated using the general form "ServiceType\AssetType\AccessType." This particular signature form identifies a service that can be used to gain access to an asset (e.g., a securable), and a type of access to the asset, e.g., a privilege level for the asset. Consider an example asset signature\DirectoryService\Group\ModifyMembership. This signature can be used to identify different principals that can be leveraged to obtain the ability to modify the membership of a group in a directory service.

Step 702 compares access privileges granted to a set of principals to the signatures. Generally, as discussed above, the signatures each represent different securable assets and respective access privileges for the different securable assets. In at least some implementations, the principals represent information (e.g., identities) that can be utilized to provide access to a securable asset. Examples of principals include user accounts, computer accounts, groups, security principals, and so forth. Access privileges for a set of principals can be determined in various ways, such as by inspecting a set of ACLs for securable assets of a particular system. With reference to a computing device, for example, access privileges for a set of principals can be determined by inspecting ACLs for securable assets that reside on and/or are accessible to the computing device.

Step 704 ascertains that a particular principal of the set of principals is able to obtain an access privilege to a particular securable asset using an access privilege granted to the principal. In at least some implementations, the AA module 116 ascertains that the particular principal can be utilized to obtain the access privilege to the particular securable asset via indirect access through a different securable asset. For instance, the AA module 116 generates access chains that describe particular accesses, such as discussed with reference to the EoP column 508 of the access analysis 422 described above with reference to FIG. 5.

For instance, based on comparing an access privilege granted to the particular principal to a signature for a first securable asset, the AA module 116 ascertains that the particular principal is granted access to the first securable asset. An ACL for the first securable asset, for instance, indicates that the particular principal is granted a particular access privilege to the first securable asset, such as an administrative privilege. Further, the AA module 116 ascertains that using the particular access privilege to the first securable asset, the particular principal is able to obtain an access privilege to a second securable asset.

The particular principal, for example, is not expressly granted the particular access privilege to the second securable asset. However, the particular principal can be leveraged utilizing the granted access privilege to the first securable asset to perform an action to obtain the access privilege to the second securable asset. Examples of different ways of obtaining an access privilege to a second securable asset via a granted access privilege to a first securable asset are discussed above.

Step 706 controls access of the particular principal to the particular securable asset based on whether the particular principal is permitted to obtain the access privilege to the particular securable asset. For instance, the particular principal is either permitted or denied the access privilege to the particular securable asset based on whether the particular principal is indicated as being permitted to obtain the access privilege. An example way for controlling access of a principal to a securable asset is discussed below.

Figure 8:
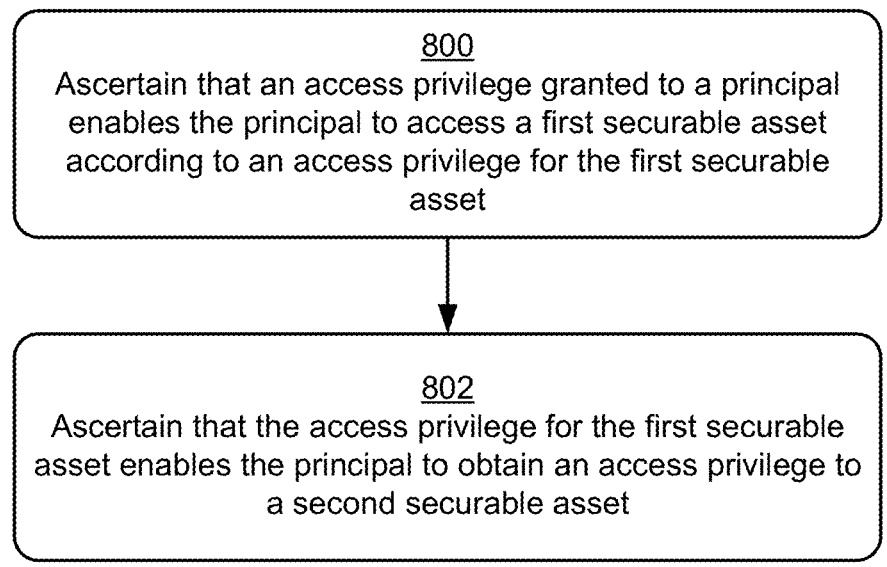
FIG. 8 is a flow diagram that describes steps in a method for determining that a principal is usable to obtain an access privilege to a securable asset accordance with one or more embodiments.

FIG. 8 is a flow diagram that describes steps in a method in accordance with one or more implementations. The method describes an example procedure for determining that a principal is usable to obtain an access privilege to a securable asset in accordance with one or more implementations. For instance, the method describes an example way of performing step 704 of the procedure described above.

Step 800 ascertains that an access privilege granted to a principal enables the principal to access a first securable asset according to an access privilege for the first securable asset. The AA module 116, for example, determines that an ACL for the first securable asset indicates that the principal is granted the access privilege. In at least one implementation, the access privilege represents an administrative access privilege for the first securable asset granted to the principal.

Step 802 ascertains that the access privilege for the first securable asset enables the principal to obtain an access privilege to a second securable asset. For instance, the AA module 116 determines that the access privilege granted to the principal for the first securable asset can be leveraged to obtain an access privilege that the principal is not expressly granted for the second securable asset.

Generally, techniques for access privilege analysis for a securable asset described herein can be leveraged to identify aggregate access of a principal including its own access as well as the sum of all accesses given to the principal based on its group memberships.

Consider, for example, that the first securable asset represents an identity that is granted the access privilege to the second securable asset. For instance, an ACL for the second securable asset indicates that the identity is granted the access privilege, but does not indicate that the principal is granted the access privilege. The access privilege granted to the principal for the first securable asset, however, enables the principal to be used to obtain control of the first securable asset, and thus obtain control of the identity. By exercising the access privilege to the first securable asset, for example, a user can obtain control of the identity and use the identity to exercise the access privilege granted to the identity for the second securable asset. For instance, the user can perform a password reset on the identity to obtain control of the identity, and thus utilize the identity to obtain an access privilege to the second securable asset.

As an example, consider that the second securable asset represents a group membership, such as an identity that has membership in a user group in a particular domain. Further, the group membership is associated with a particular access privilege of the group. Accordingly, this enables the user to access resources allocated to the group, such as files, applications, services, and so forth.

Figure 9:
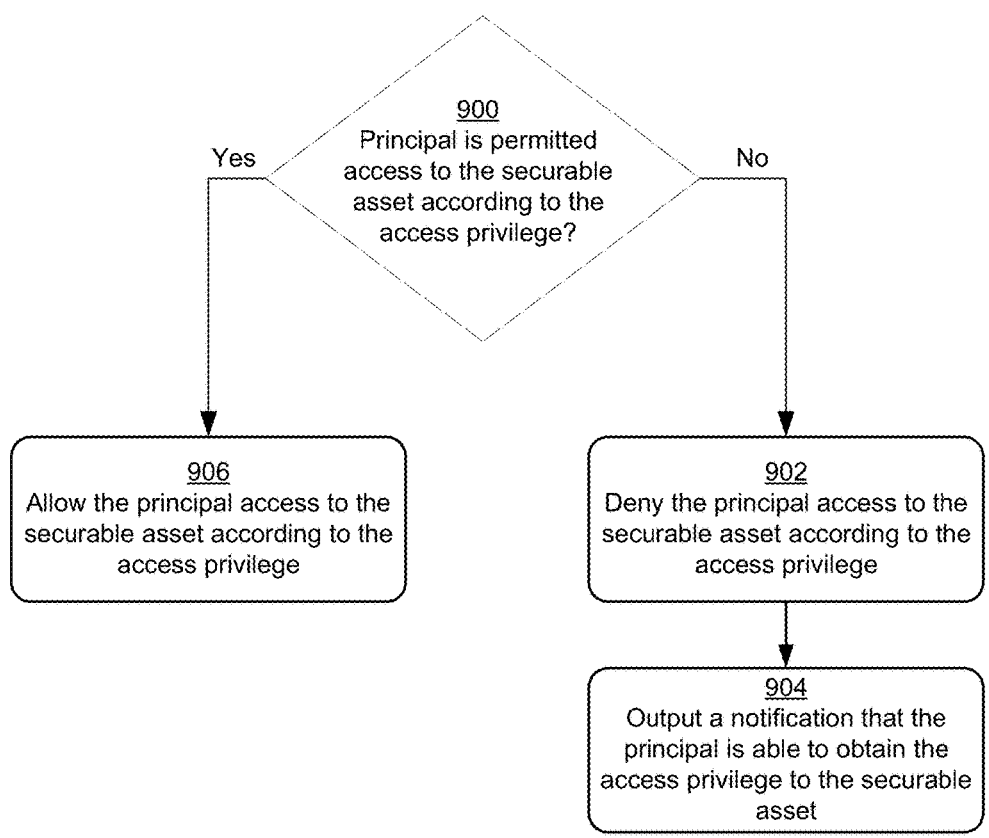
FIG. 9 is a flow diagram that describes steps in a method for determining whether a principal is permitted an access privilege to a securable asset accordance with one or more embodiments.

FIG. 9 is a flow diagram that describes steps in a method in accordance with one or more implementations. The method describes an example procedure for determining whether a principal is permitted an access privilege to a securable asset in accordance with one or more implementations. For instance, the method describes an example way of performing step 706 of the procedure described above with reference to FIG. 7.

Step 900 ascertains whether the principal is permitted access to the securable asset according to the access privilege. The AA module 116, for instance, determines whether the principal is permitted to exercise the access privilege for accessing the securable asset. In at least some implementations, the AA module 116 ascertains whether the secure permissions list 120 indicates that the principal is permitted to access the securable asset according to the access privilege. In an example implementation, the AA module 116 traverses an EoP chain backwards for the access to the securable to ascertain whether a starting principal (e.g., from the starting principal column 502 discussed above with reference to FIG. 5) is permitted to access an ending securable, e.g., from the ending securable column 506 discussed above with reference to FIG. 5.

If the principal is not permitted to exercise the access privilege for accessing the securable asset ("No"), step 902 denies the principal access to the securable asset according to the access privilege. The AA module 116, for instance, determines that the principal is not permitted to exercise the access privilege for accessing the securable asset. In at least some implementations, the AA module 116 ascertains that the secure permissions list 120 does not indicate that the principal is permitted access to the securable asset according to the access privilege, and/or that the secure permissions list 120 indicates that the principal is not permitted access to the securable asset according to the access privilege.

According to one or more implementations, the AA module 116 causes the principal to be denied access to the securable asset according to the access privilege by notifying a functionality that controls access to the securable asset that the principal is to be denied access to the securable asset. For instance, an access privilege granted to the principal can be modified to prevent the principal from having the ability to indirectly obtain the access privilege to the securable asset. As an example, the principal can be prevented from performing certain actions that would enable such indirect access, such as by disallowing the principal from being used to perform a password reset on an identity that can be used to obtain the access privilege to the securable asset.

Step 904 outputs a notification that the principal is able to obtain the access privilege to the securable asset. According to one or more implementations, the notification further indicates that the principal is not permitted access to the securable asset according to the access privilege. In at least one implementation, the AA module 116 outputs a visual notification, such as a graphical user interface (GUI) that indicates that the principal is able to obtain the access privilege to the securable asset, and that the principal is not permitted access to the securable asset according to the access privilege. At least a portion of the access analysis 422 discussed above, for instance, is visually displayed as part of a GUI.

If the principal is permitted to exercise the access privilege for accessing the securable asset ("Yes"), step 906 allows the principal access to the securable asset according to the access privilege. According to one or more implementations, the AA module 116 causes the principal to be allowed access to the securable asset according to the access privilege by notifying a functionality that controls access to the securable asset that the principal is to be allowed access to the securable asset. In at least some implementations, the AA module 116 outputs a notification (e.g., as part of a GUI) that the principal is able to obtain the access privilege to the securable asset, and that the principal is permitted access to the securable asset according to the access privilege.

Figure 10:
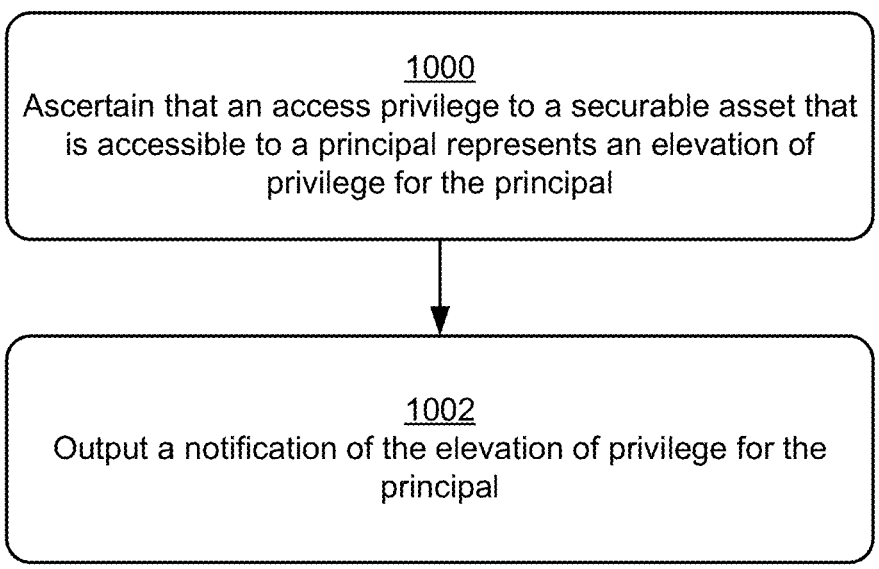
FIG. 10 is a flow diagram that describes steps in a method for determining that an access privilege to a securable asset represents an elevation of privilege accordance with one or more embodiments.

FIG. 10 is a flow diagram that describes steps in a method in accordance with one or more implementations. The method describes an example procedure for determining that an access privilege to a securable asset represents an elevation of privilege in accordance with one or more implementations. For instance, the method describes an example way of performing step 704 of the procedure described above with reference to FIG. 7 and/or step 904 of the procedure described above with reference to FIG. 9.

Step 1000 ascertains that an access privilege to a securable asset that is accessible to a principal represents an elevation of privilege for the principal. The AA module 116, for instance, ascertains that a particular principal is able to obtain an access privilege to a particular securable asset that the principal is not expressly granted, i.e., an elevation of privilege with respect to the securable asset. Example ways of making this determination are discussed above, such as with reference to FIG. 7.

Step 1002 outputs a notification of the elevation of privilege for the principal. For example, the AA module 116 outputs the notification, such as a visual notification of the elevation of privilege. One example notification is discussed above with respect to step 904 of FIG. 9. In at least some implementations, the AA module 116 controls access of the principal to the securable asset, such as described above with reference to FIG. 9.

Accordingly, techniques described herein enable access privileges to securable assets that are not explicitly granted and/or readily ascertainable to be identified. Further, access to a securable asset is controllable to prevent an unauthorized entity from gaining indirect access to the securable asset. By preventing such indirect access, sensitive resources are protected from unauthorized access which may be leveraged to perform harmful and malicious actions utilizing the sensitive resources.

Having discussed some example procedures, consider now a discussion of an example system and device in accordance with one or more embodiments.

Example System and Device

Figure 11:
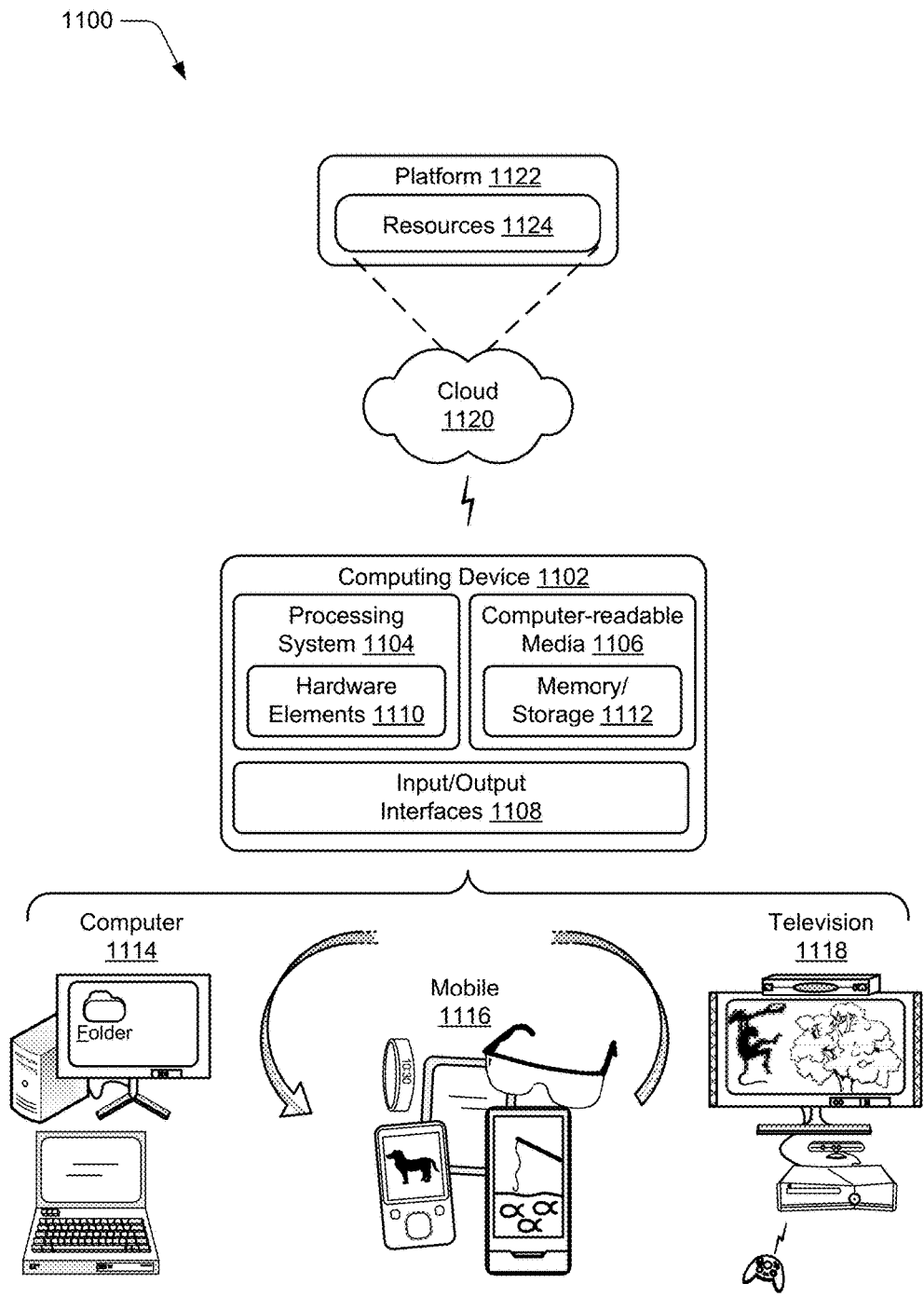
FIG. 11 illustrates an example system and computing device as described with reference to FIG. 1, which are configured to implement embodiments of techniques described herein.

FIG. 11 illustrates an example system generally at 1100 that includes an example computing device 1102 that is representative of one or more computing systems and/or devices that may implement various techniques described herein. For example, one or more portions of the computing system 102 discussed above with reference to FIG. 1 can be embodied as the computing device 1102. The computing device 1102 may be, for example, a server of a service provider, a device associated with the client (e.g., a client device), an on-chip system, and/or any other suitable computing device or computing system.

The example computing device 1102 as illustrated includes a processing system 1104, one or more computer-readable media 1106, and one or more Input/Output (I/O) Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1110 and computer-readable media 1106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules that are executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, portable music player, portable gaming device, a tablet computer, a wearable device, a multi-screen computer, and so on. The computing device 1102 may also be implemented as the television 1118 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. For example, functionalities discussed with reference to the AA module 116 may be implemented all or in part through use of a distributed system, such as over a "cloud" 1120 via a platform 1122 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

EXAMPLE 1

A system for controlling access to a securable asset, the system including: at least one processor; and one or more computer-readable storage media including instructions stored thereon that, responsive to execution by the at least one processor, cause the system perform operations including: generating an asset signature that represents an instance of a securable asset and an access privilege to the securable asset; comparing one or more access privileges granted to a principal to the asset signature to ascertain whether the principal is able to obtain the access privilege for accessing the securable asset; ascertaining based on said comparing that the principal is able to obtain the access privilege to the securable asset using the one or more access privileges granted to the principal; and controlling access of the principal to the securable asset based on whether the principal is permitted to obtain the access privilege to the securable asset.

EXAMPLE 2

A system as described in example 1, wherein the securable asset includes one or more of an access controlled data object or an access controlled identity.

EXAMPLE 3

A system as described in one or more of examples 1 or 2, wherein the asset signature includes a string that represents both the instance of the securable asset and the access privilege for the securable asset.

EXAMPLE 4

A system as described in one or more of examples 1-3, wherein the access privilege indicates a particular level of access to the securable asset.

EXAMPLE 5

A system as described in one or more of examples 1-4, wherein the principal includes an identity.

EXAMPLE 6

A system as described in one or more of examples 1-5, wherein the one or more access privileges granted to the principal are retrieved from an access control list to a different securable asset.

EXAMPLE 7

A system as described in one or more of examples 1-6, wherein said ascertaining includes: ascertaining that the one or more access privileges granted to the principal enable the principal to access a different securable asset according to an access privilege for the different securable asset; and ascertaining that the access privilege for the different securable asset enables the principal to obtain the access privilege to the securable asset.

EXAMPLE 8

A system as described in one or more of examples 1-7, wherein the operations further include: ascertaining utilizing that asset signature that the one or more privileges granted to the principal provide the principal with administrative access to a different securable asset; and ascertaining that the administrative access to the different securable asset enables the principal to obtain the access privilege to the securable asset.

EXAMPLE 9

A system as described in one or more of examples 1-8, wherein the operations further include ascertaining that the access privilege to the securable asset represents an elevation of privilege for the principal.

EXAMPLE 10

A system as described in one or more of examples 1-9, wherein the operations further include: ascertaining that the principal is not permitted access to the securable asset according to the access privilege; and outputting a notification that the principal is able to obtain the access privilege to the securable asset, and that the principal is not permitted access to the securable asset according to the access privilege.

EXAMPLE 11

A system as described in one or more of examples 1-10, wherein said controlling includes: ascertaining that the principal is not permitted access to the securable asset according to the access privilege; and denying the principal access to the securable asset according to the access privilege based on said ascertaining that the principal is not permitted access to the securable asset according to the access privilege.

EXAMPLE 12

A computer-implemented method for controlling access to a securable asset, the method including: comparing one or more access privileges granted to a principal to a signature that represents both a securable asset and an access privilege for the securable asset to ascertain whether the principal is able to obtain the access privilege for accessing the securable asset; ascertaining based on said comparing that the principal is able to obtain the access privilege to the securable asset using the one or more access privileges granted to the principal; and controlling access of the principal to the securable asset effective to either allow or deny access of the principal to the securable asset according to the access privilege based on whether the principal is permitted to obtain the access privilege to the securable asset.

EXAMPLE 13

A method as described in example 12, wherein the asset Signature includes a string that represents both a type of the securable asset and the access privilege for the securable asset.

EXAMPLE 14

A method as described in one or more of examples 12 or 13, wherein the securable asset includes an identity that is a member of a group that the principal is not a member of, and wherein said ascertaining includes: ascertaining that the one or more privileges granted to the principal enable the principal to access a different securable asset according to an access privilege for the different securable asset; and ascertaining that the access privilege for the different securable asset enables the principal to obtain control of the identity and obtain an access privilege for the group using the identity.

EXAMPLE 15

A method as described in one or more of examples 12-14, further including: ascertaining that the access privilege to the securable asset represents an elevation of privilege for the principal; and outputting a notification of the elevation of privilege for the principal.

EXAMPLE 16

A method as described in one or more of examples 12-15, wherein said controlling includes denying the principal access to the securable asset according to the access privilege based on ascertaining that the principal is not permitted access to the securable asset according to the access privilege.

EXAMPLE 17

A computer-implemented method for controlling access to a securable asset, the method including: comparing access privileges granted to a set of principals to signatures that each represent different securable assets and respective access privileges for the different securable assets; ascertaining based on said comparing that a particular principal of the set of principals is able to obtain an access privilege to a particular securable asset using an access privilege granted to the particular principal for a different securable asset; and controlling access of the particular principal to the particular securable asset based on whether the particular principal is permitted to obtain the access privilege to the particular securable asset.

EXAMPLE 18

A method as described in example 17, further including outputting an access analysis that indicates access privileges for at least some of the principals to at least some of the different securable assets.

EXAMPLE 19

A method as described in one or more of examples 17 or 18, wherein said controlling includes: ascertaining that the principal is not permitted access to the securable asset according to the access privilege; and denying the principal access to the securable asset according to the access privilege based on said ascertaining that the principal is not permitted access to the securable asset according to the access privilege.

EXAMPLE 20

A method as described in one or more of examples 17-19, further including: ascertaining that the principal is not permitted access to the securable asset according to the access privilege; and outputting a notification that the principal is able to obtain the access privilege to the securable asset, and that the principal is not permitted access to the securable asset according to the access privilege.

CONCLUSION

Techniques for access privilege analysis for a securable asset are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
   generating an asset signature that represents an instance of a securable asset and an access privilege to the securable asset;
   comparing one or more access privileges granted to a principal to the asset signature to ascertain whether the principal is able to obtain the access privilege for accessing the securable asset;
   ascertaining based on said comparing that the principal is able to obtain the access privilege to the securable asset using the one or more access privileges granted to the principal;
   generating an access chain and a recursion depth for the access chain that enable the principal to gain access to the securable asset, the access chain representing one or more privilege elevations for access to the securable asset; and
   controlling the access of the principal to the securable asset based on whether the principal is permitted to obtain the access privilege to the securable asset determined by traversing the access chain backwards.

2. The system as recited in claim 1, wherein the securable asset comprises one or more of an access controlled data object or an access controlled identity.

3. The system as recited in claim 1, wherein the asset signature comprises a string that represents both the instance of the securable asset and the access privilege for the securable asset.

4. The system as recited in claim 1, wherein the access privilege indicates a particular level of access to the securable asset.

5. The system as recited in claim 1, wherein the principal comprises an identity.

6. The system as recited in claim 1, wherein the one or more access privileges granted to the principal are retrieved from an access control list to a different securable asset.

7. The system as recited in claim 1, wherein said ascertaining comprises:
   ascertaining that the one or more access privileges granted to the principal enable the principal to access a different securable asset according to an access privilege for the different securable asset; and
   ascertaining that the access privilege for the different securable asset enables the principal to obtain the access privilege to the securable asset.

8. The system as recited in claim 1, wherein the operations further include:
   ascertaining, utilizing the asset signature, that the one or more privileges granted to the principal provide the principal with administrative access to a different securable asset; and
   ascertaining that the administrative access to the different securable asset enables the principal to obtain the access privilege to the securable asset.

9. The system as recited in claim 1, wherein the operations further include ascertaining that the access privilege to the securable asset represents an elevation of privilege for the principal.

10. The system as recited in claim 1, wherein the operations further include:
   ascertaining that the principal is not permitted access to the securable asset according to the access privilege; and
   outputting a notification that the principal is able to obtain the access privilege to the securable asset, and that the principal is not permitted access to the securable asset according to the access privilege.

11. The system as recited in claim 1, wherein said controlling comprises:
   ascertaining that the principal is not permitted access to the securable asset according to the access privilege; and
   denying the principal access to the securable asset according to the access privilege based on said ascertaining that the principal is not permitted access to the securable asset according to the access privilege.

12. A computer-implemented method, comprising:
   comparing one or more access privileges granted to a principal to a signature that represents both a securable asset and an access privilege for the securable asset to ascertain whether the principal is able to obtain the access privilege for accessing the securable asset;
   ascertaining based on said comparing that the principal is able to obtain the access privilege to the securable asset using the one or more access privileges granted to the principal;
   generating an access chain that represents one or more privilege elevations that enable access to the securable asset, the access chain indicating a recursion depth for the one or more privilege elevations; and
   controlling access of the principal to the securable asset effective to either allow or deny access of the principal to the securable asset according to the access privilege based on whether the principal is permitted to obtain the access privilege to the securable asset, said denying access including modifying the access privilege to prevent the principal from obtaining the access privilege.

13. The method as described in claim 12, wherein the asset signature comprises a string that represents both a type of the securable asset and the access privilege for the securable asset.

14. The method as described in claim 12, wherein the securable asset comprises an identity that is a member of a group that the principal is not a member of, and wherein said ascertaining comprises:
   ascertaining that the one or more privileges granted to the principal enable the principal to access a different securable asset according to an access privilege for the different securable asset; and
   ascertaining that the access privilege for the different securable asset enables the principal to obtain control of the identity and obtain an access privilege for the group using the identity.

15. The method as described in claim 12, further comprising:
   ascertaining that the access privilege to the securable asset represents an elevation of privilege for the principal; and
   outputting a notification of the elevation of privilege for the principal.

16. The method as described in claim 12, wherein said controlling comprises denying the principal access to the securable asset according to the access privilege based on ascertaining that the principal is not permitted access to the securable asset according to the access privilege.

17. A computer-implemented method, comprising:
   comparing access privileges granted to a set of principals to signatures that each represent different securable assets and respective access privileges for the different securable assets;
   ascertaining based on said comparing that a particular principal of the set of principals is able to obtain an access privilege to a particular securable asset using an access privilege granted to the particular principal for a different securable asset;
   controlling access of the particular principal to the particular securable asset based on whether the particular principal is permitted to obtain the access privilege to the particular securable asset; and
   outputting an access analysis that indicates access privileges for at least some of the principals to at least some of the different securable assets, the access analysis including an access chain that enables the particular principal to gain access to the particular securable asset and a recursion depth for the access chain, the access chain representing one or more privilege elevations that enable access to the particular securable asset.

18. The method as described in claim 17, wherein said controlling comprises:
   ascertaining that the particular principal is not permitted access to the particular securable asset according to the access privilege; and
   denying the particular principal access to the particular securable asset according to the access privilege based on said ascertaining that the particular principal is not permitted access to the particular securable asset according to the access privilege.

19. The method as described in claim 17, further comprising:
   ascertaining that the particular principal is not permitted access to the particular securable asset according to the access privilege; and
   outputting a notification that the particular principal is able to obtain the access privilege to the particular securable asset, and that the particular principal is not permitted access to the particular securable asset according to the access privilege.

20. The method as described in claim 17, wherein the particular principal comprises an identity.

* * * * *